United States Patent [19]

Minemura et al.

[11] Patent Number: 4,773,059
[45] Date of Patent: Sep. 20, 1988

[54] INFORMATION RECORDING AND REPRODUCING APPARATUS HAVING RECORDING MEDIUM MADE OF ALLOY WHICH HAS AT LEAST TWO DIFFERENT CRYSTALLINE STRUCTURES IN ITS SOLID STATE

[75] Inventors: Tetsuro Minemura; Hisashi Andoh, both of Hitachi; Isao Ikuta, Iwaki; Yoshiaki Kita, Katsuta; all of Japan

[73] Assignee: Hitachi, Ltd., Tokyo, Japan

[21] Appl. No.: 142,318

[22] Filed: Dec. 30, 1987

Related U.S. Application Data

[63] Continuation of Ser. No. 708,931, Mar. 6, 1985, abandoned.

[30] Foreign Application Priority Data

Mar. 7, 1984 [JP] Japan .................... 59-42079

[51] Int. Cl.$^4$ .................. G11B 7/24; G11B 7/00
[52] U.S. Cl. .................... 369/100; 369/288; 369/108; 346/135.1; 365/119
[58] Field of Search ............. 369/100, 101, 108, 125, 369/275, 283, 284, 288; 365/113, 118, 119, 126, 124, 120, 106, 127; 358/342; 346/135.1

[56] References Cited

U.S. PATENT DOCUMENTS

| | | | |
|---|---|---|---|
| 3,868,651 | 2/1975 | Ovshinsky | 365/113 |
| 3,959,799 | 5/1976 | Gambino et al. | 365/127 |
| 4,371,954 | 2/1983 | Cornet | 369/275 |
| 4,461,807 | 7/1984 | Mori et al. | 346/135.1 |
| 4,496,957 | 1/1985 | Smith et al. | 346/135.1 |
| 4,523,304 | 6/1985 | Satoh et al. | 358/342 |
| 4,574,366 | 3/1986 | Potenber et al. | 365/127 |
| 4,606,018 | 8/1986 | Sugiki et al. | 369/275 |
| 4,651,172 | 3/1987 | Watanabe et al. | 346/135.1 |

FOREIGN PATENT DOCUMENTS 0064777 11/1982 European Pat. Off. .

OTHER PUBLICATIONS

IBM Technical Disclosure Bulletin, M. H. Brodsky, "Multilayer Memory Elements . . . ", vol. 13, No. 10, 3/71, p. 3001.

Primary Examiner—Raymond F. Cardillo
Assistant Examiner—Robert A. Weinhardt
Attorney, Agent, or Firm—Antonelli, Terry & Wands

[57] ABSTRACT

An information recording and reproducing apparatus is disclosed, which makes use a recording medium made of a metal or alloy having phases different in their crystalline structures at at least two temperature regions in the solid state and capable of causing phase transformation by heating and quenching. Information such as signals, letters, patterns and symbols are recorded in a distinctive manner and erased by making use of a change in the spectral reflectance owing to the phase transformation. Rewriting can be made easily by making use of the energy of a light beam such as a laser beam.

15 Claims, 7 Drawing Sheets

INFORMATION RECORDING AND REPRODUCING APPARATUS HAVING RECORDING MEDIUM MADE OF ALLOY WHICH HAS AT LEAST TWO DIFFERENT CRYSTALLINE STRUCTURES IN ITS SOLID STATE

This application is a continuation of application Ser. No. 708,931, filed Mar. 6, 1985 now abandoned.

BACKGROUND OF THE INVENTION

1. Field of the Invention

The present invention relates to a novel apparatus for recording and reproducing information and, more particularly, to an information recording and reproducing apparatus in which the recording, erasion and reproduction of information are made by making use of a change in the crystalline structure of the recording medium caused by application of light or heat energy to the recording medium.

2. Description of the Prior Art

In recent years, there is an increasing demand for higher densification and digitization of information recording, which in turn gives rise to the demand for development of various information recording/reproducing systems. In particular, optical disc, which is capable of recording, erasing and reproducing information in cooperation with a laser beam energy, exhibits a higher recording density than conventionally used magnetic discs and, hence, is considered quite promising for the future. The optical disc is described in detail in Industrial Rare Metal No. 80, 1983" (Optical Disc and Material), pp 37–41. Optical discs capable of reproducing information by laser beam have been put into practical use under the name of Compact Disc (abbreviation "CD").

On the other hand, the presently available systems which enable recording of information can be classified into two types: namely, an unerasable type and rewritable type. The unerasable type permits writing only once and does not allow erasure, while the rewritable type permits reapeated writing and erasure. The recording method of the unerasable type forms fine convexities and concavities in the medium by breaking or shaping the medium by means of a laser beam, while the reading of the recorded information is conducted by making use of a change in the light reflectance due to interference of the laser beam caused by the minute concavities and convexities. For instance, it is well known to form convexities and concavities by melting or sublimation of a recording medium made of, for example, tellurium (Te) or its alloy, by means of a laser beam. This type of recording medium, however, involves the problem of toxicity.

On the other hand, photoelectromagnetic materials are major materials for the rewritable type medium. The recording with this material is conducted by inverting local magnetic anisotropy in the medium at a temperature around the Curie point or compensation point by the energy of a light, while the reproduction is conducted by means of a rotation amount of plane of polarization caused by the magnetic Faraday effect or magnetic kerr effect brought about by the polarized incident light. This recording/reproducing method is considered as being the most promising method using the medium of rewritable type and an intensive study is being made with a prospect that this method will be put into practical use within several years. Unfortunately, however, no material has been found which would provide a sufficiently large rotation amount of the plane of polarization. At the present stage, it is still impossible to obtain sufficiently high level of output such as S/N (Single/Number) and C/N (Carrier/Number), despite various efforts such as lamination of the medium material.

Another known system of rewritable type makes use of a change in the reflectance caused by a reversible phase change between amorphous state and crystalline state of the recording medium material. Unerasable type mediums making use of unidirectional or irreversible phase change between crystalline state and amorphous state also have been known. These mediums, however, suffer from problems such as poor reliability of the disc due to lack of phase stability at room temperature, because the crystallization of the amorphous phase takes place at low temperatures.

SUMMARY OF THE INVENTION

Object of the Invention

Accordingly, an object of the invention is to provide an information recording and reproducing apparatus using a recording medium which permits an easy rewriting of information and high density of recording.

Brief Summary of the Invention

To this end, according to the invention, there is provided an information recording and reproducing apparatus characterized by comprising a recording medium made of a metal or alloy which has at least two kinds of crystalline structures in the solid state and which can maintain one of the crystalline structures obtained in one temperature region even in the other temperature region.

Thus, the metal or alloy used as the recording medium in the information recording and reproducing apparatus of the invention has at least two kinds of phases in the solid state, and the recording, erasure and reproduction of information such as signals, letters, characters, patterns, etc. are conducted by making an efficient use of a change in the crystalline structure caused by a transformation of these phases.

DESCRIPTION OF THE PREFERRED EMBODIMENTS

Figure 1:
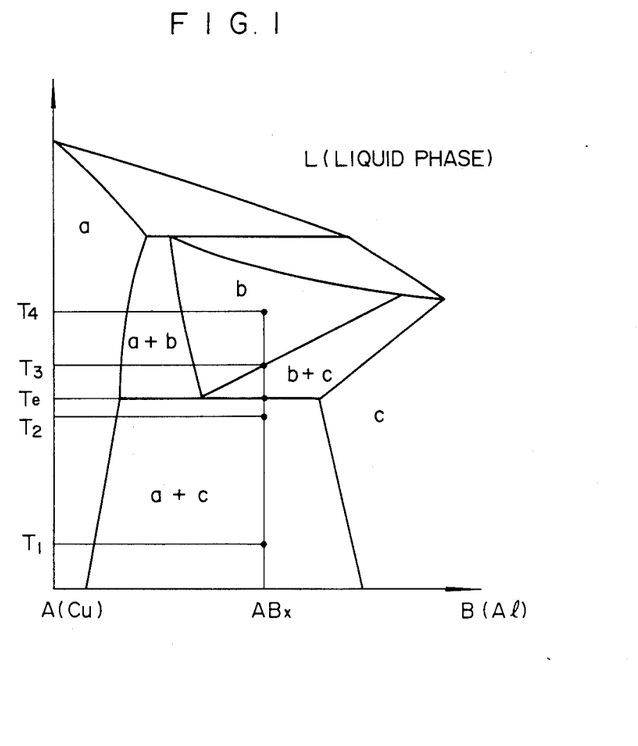
FIG. 1 is a binary phase diagram for explaining a reversible phase change between different crystalline phases.

FIG. 1 is a schematic illustration of binary phase diagram of a Cu-Al alloy as an example of the material of recording, medium used in the invention, which explains by means of a model, the principle of recording, erasure and reproduction through a reversible phase transformation in the Cu-Al alloy. Assume here an $AB_x$ alloy in A-B binary system alloy having such a phase diagram as shown in FIG. 1. The Cu-Al alloy at this composition has, in its solid state temperature range, three kinds of phase states: namely, single b-phase, (b+c)-phase and (a+c)-phase. The crystal structure differs respectively in single a-, b- and c-phases, and different optical characteristics are exhibited by different single phases as well as mixed phases. An explanation will be made hereinunder as to how the spectral reflectance, as an example of the optical characteristics, is changed in relation to the difference in the crystalline structures. In the equilibrium state at a temperature $T_1$, the spectral reflectance of the alloy is almost equal to that of the c-phase because in this state the alloy exhibits Crich (a+c)-phase. When this alloy is heated up to $T_4$ and then quenched, the b-phase is super-cooled to $T_1$ so that the alloy exhibits a spectral reflectance of b-phase at the temperature $T_1$. Further, when this super-cooled phase is heated to a temperature $T_2$ higher than $T_1$ and then cooled, the b-phase is changed into (a+c)-phase so that the spectral reflectance approximating that of the c-phase, initially obtained in the equilibrium state at the temperature $T_1$, is recovered thus attaining a reversible change in the spectral reflectance. When the alloy is heated at a temperature above $T_1$, it is possible to change the phase from b-phase into (a+c)-phase, and in this case the heating temperature must be below Te but is preferably as high as possible because such a high heating temperature can effectively shorten the time length required for the phase change. As mentioned above, it is possible to write, erase and reproduce information by making an efficient use of change in the spectral reflectance due to the phase transformation in the solid state. Thus, any metal, non-metal and compound which exhibits a reversible change in phase in the solid state can be used as the material of the recording medium in the information recording and reproducing apparatus of the invention. Metals usable as the material of the recording medium are those belonging to groups Ib, IIb, IIIb, IVb, Vb, VIb, VIIb and VIII of the periodic table, as well as alloys containing such metals as their main components, insofar as they cause the reversible change in phase in the solid state. Examples of such metals are Cu, Ag, Au, Zn, Cd, B, Al, Ga, In, Tl, Si, Ge, Sn, Pb, As, Sb, Bi, Se, Te, Po, Fe, Co, Ni, Ru, Rh, Pd, Os, Ir and Pt. Alloys of these metals are also usable. As mentioned above, these metals or alloys should have at least two kinds of phases in the solid state. Among these metals and alloys, Cu-base alloys exhibiting a distinctive change in the spectral reflectance provides especially good results, and excellent effect is also produced when Au-base alloys or Ag-base alloys are used as the material of recording medium. As is known, Cu exhibits a specific color of brown in comparison with other metals or alloys. In addition, Cu exhibits a specific spectral reflectance characteristic in which large reflectance is obtained in the side longer than about 500 nm in terms of the wavelength. Furthermore, when another element is added to Cu so as to form an alloy, the brown color peculiar to Cu is changed into another color depending on the change in the phase and crystalline structure of the alloy. For instance, when at least one of Al, Ga, In, Sb, Si, Sn and Zn is added to Cu, the color of is changed from brown into gold, and as a result the spectral reflectance is also changed. Cu generally has face centered cubic type ($\alpha$-phase) crystalline structure, but forms a compound (generally $\alpha$-phase) when such element as mentioned above is added. The Cu-base alloys exhibit, in the region of the mixed ($\alpha+\gamma$)-phase, gold color and, in addition, the drastic change in the spectral reflectance in the wavelength region around 500 nm is lost, and the spectral reflectance is gently changed in the longer wavelength region as in the case of the brown color. The Cu-base alloys mentioned above have a common feature that a phase ($\beta$-phase) having a body centered cubic type structure or a regulated body centered cubic type structure exists at the high-temperature phase of the composition in the mixed ($\alpha+\gamma$)-phase region. This $\beta$-phase exhibits brown color by suitable selection of the alloy composition. Namely, depending on the alloy composition, some of the alloys induce a martensitic transformation of thermoelastic type when the $\beta$-phase is super-cooled to room temperature by heating and quenching. As a result of this transformation, the color of the alloy becomes gold. The color of the alloy, however, becomes brown when the transformation temperature is lowered to below the room temperature. On the other hand, the brown color fades when the content of the alloying element is increased too much. Therefore, the brown color is obtained at a temperature above the martensitic transformation temperature or with the alloy composition capable of lowering the transformation temperature to below the room temperature. The addition of transition metals, B, C, Ge, Ag, Cd, Au, Pb, Be and Mg is effective in the control of the transformation temperature.

As has been explained, the Cu-base alloys used as the recording medium in the information recording and reproducing apparatus of the invention preferably exhibits a reversible change in color between brown and gold due to phase transformation between the $\beta$-phase and ($\alpha+\gamma$)-phase caused by heating and quenching, as well as a large change in the spectral reflectance corresponding to the change in the color. It is to be noted that a change in the transmissivity of a laser beam, a change in the refractive index and a polarization can be utilized, besides the spectral reflectance.

The alloys usable as the material of the recording medium are those alloys which can maintain a phase at the high temperature state even at the low temperature state after being super-cooled. These alloys have two or more kinds of phases in the solid state, and so it is possible to record information by making an efficient use of the difference in optical characteristics between these different kinds of phases.

Examples of such alloys are Ni-Ti alloy, Cu-Al alloy, Cu-Zn alloy, Cu-Al-Zn alloy, Cu-Al-Ni alloy, Ti-Nb alloy, Ti-Mn alloy, Ti-Mo alloy, Cu-Al-Mn alloy, Cu- Al-Fe-Cr alloy, Cu-Ga alloy, Cu-Al-Ga alloy, Cu-In alloy, Cu-Al-In alloy, Cu-Ge alloy, Cu-Al-Ge alloy, Cu-Sn alloy, Cu-Al-Sn alloy, Au-Al alloy, Ag-Al alloy, Ag-Al-Au alloy, Ag-Al-Cu alloy, Ag-Al-Au-Cu alloy, Ag-Al-Cd alloy, Ag-Zn alloy, Sb-In-Se alloy, In-Tl alloy, Co-Mn alloy, Au-Cd alloy, Mn-Cu alloy, U-Mo alloy, Fe-Mn alloy, Fe-Cr-Ni alloy and so forth.

More practically, Cu-base alloys containing 0 to 10 wt % of Al and 10 to 40 wt % of Zn, Cu-base alloys containing 20 to 30 wt % of Sn, Cu-base alloys containing 10 to 20 wt % of Al and 0 to 10 wt % of Ni, Ni-base lloys containing 40 to 50 wt % of Ti and so forth are listed as the examples of the alloy compositions. The alloy compositions shown in Tables 1 and 2 are especially preferable examples.

TABLE 1

| No. | Alloys | Compositions |
|---|---|---|
| 1 | Ag—Cd | 44~49 at % Cd |
| 2 | Au—Cd | 46.5~50 at % Cd |
| 3 | Cu—Au—Zn | 23~28 at % Au |
|   |   | 45~47 at % Zn |
| 4 | Cu—Zn—X | Several wt % X |
|   | (X = Si, Al, Ga) | 10~40 wt % Zn |
| 5 | In—Tl | 18~23 at % Tl |
| 6 | Ni—Al | 36~38 at % Al |
| 7 | Ti—Ni | 49~51 at % Ni |
| 8 | Fe—Pt | ~25 at % Pt |
| 9 | Cu—Al—Mn—Zn | 6~12 wt % Al |
|   |   | 0.1~12 wt % Mn |
|   |   | 0.1~24 wt % Zn |
| 10 | Ni—Ti—Cu—X | ~30 wt % Cu |
|   | (X = Al, Zr, Co, | 0.01~5 wt % X |
|   | Cr, Fe) | 40~50 wt % Ti |
| 11 | Ni—Ti—Fe | 3.2~3.6 at % Fe |
| 12 | U—Mo | 2~7 wt % Mo |
| 13 | U—Nb | 3~11 wt % Nb |
| 14 | U—Re | 2~7 wt % Re |
| 15 | Mn—Cu | 5~50 wt % Cu |

TABLE 2

| No. | Ag | Al | Au | Cu | Others |
|---|---|---|---|---|---|
| 16 | — | 14–16.5 | — | Bal. | |
| 17 | — | " | — | " | Ni 0.01–20 (2.5–7.5) |
| 18 | — | " | — | " | Mn 0.01–15 |
| 19 | — | " | — | " | Fe 0.01–10 and/or Cr 0.01–10 |
| 20 | — | — | — | " | Ga 21–30 (22.5–25) |
| 21 | — | 0.01–3.0 (0.05–0.5) | — | " | Ga 21–30 (22.5–25) |
| 22 | — | — | — | " | In 20–40 (25–35) |
| 23 | — | 0.01–3.0 (0.05–0.5) | — | " | In 20–40 (25–35) |
| 24 | — | — | — | " | Ge 20–28 (25–35) |
| 25 | — | 0.01–3.0 (0.05–0.5) | — | " | Ge 20–28 (25–35) |
| 26 | — | — | — | " | Sn 16–35 (20–30) |
| 27 | — | 0.01–3.0 (0.05–0.5) | — | " | Sn 16–35 (20–30) |
| 28 | — | 2.5–4.0 | Bal. | — | |
| 29 | Bal. | 6–10 | — | — | |
| 30 | " | 6–10 | 0.1–10 | 0.1–15 | (Au and/or Cu) |
| 31 | " | 0.01–2.0 | — | — | Cd 43–59 |
| 32 | " | — | — | — | Zn 30–46 |

Values appearing in ( ) show preferred ranges.

In the writing and erasure by heating and quenching of a recording medium, a higher response speed is obtained when the heat capacity of the recording medium is reduced. In order to reduce the heat capacity of the recording medium, it is quite an effective measure to form the recording medium into a thin film-like form by a direct quenching and solidification from the gaseous or liquid state. The formation of the thin film can be effected by various techniques such as PVD (Physical Vapor Deposition) including vacuum evaporation deposition and sputtering, CVD (Chemical Vapor Deposition), melt quenching method in which the material in the molten state is poured onto the surface of a metallic roll rotating at a high speed so as to quench and solidify the melt, firing of powdered material applied onto a substrate, electroplating and chemical plating. In order to attain a distinctive local change in the spectral reflectance and, hence, a high S/N, the particles of crystals constituting the foil or thin film are preferably made as small as possible. The techniques mentioned above generally produce fine crystalline structure because they employ a quenching for forming a foil or film. Further, from the view point of reduction in the heat capacity, it is quite effective to form the recording medium from the metals or alloys in the powdered state. A better effect will be produced when the powder is mixed with a binder and applied onto the surface of a substrate. In the case of the film formed on a substrate by this process, the film may be divided into sections of the minimum size of the recording unit, thus effectively reducing the heat capacity.

As stated before, the invention provides an information recording and reproducing apparatus having a recording means, reproducing means and an erasive means, characterized by comprising a recording medium which has at least two kinds of crystalline structures in the solid state and which can maintain the crystalline structure obtained at one temperature region even at the other temperature region.

The recording medium according to the invention may be used in various types of optical discs such as DAD (Digital Audio Disc or compact disc), video disc and memory disc.

Figure 2:
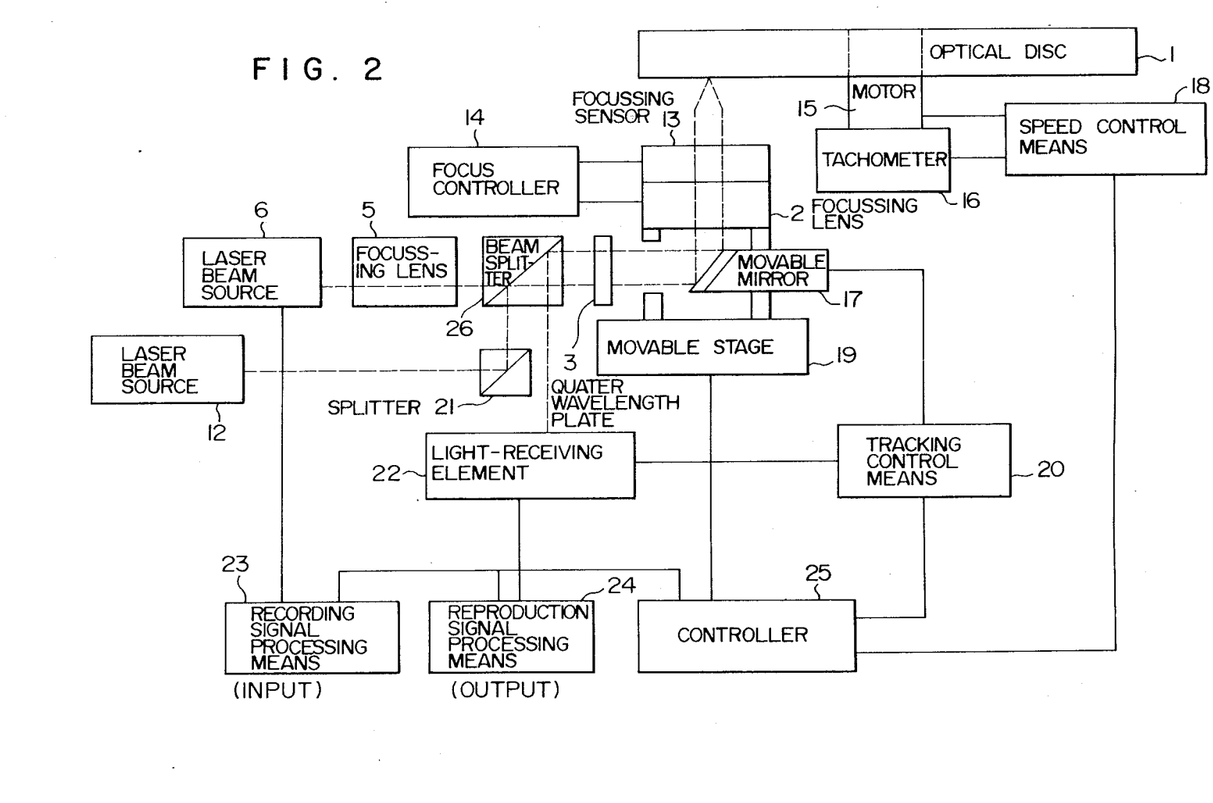
FIG. 2 is an illustration of an information recording and reproducing apparatus constructed in accordance with the invention.
Figure 3:
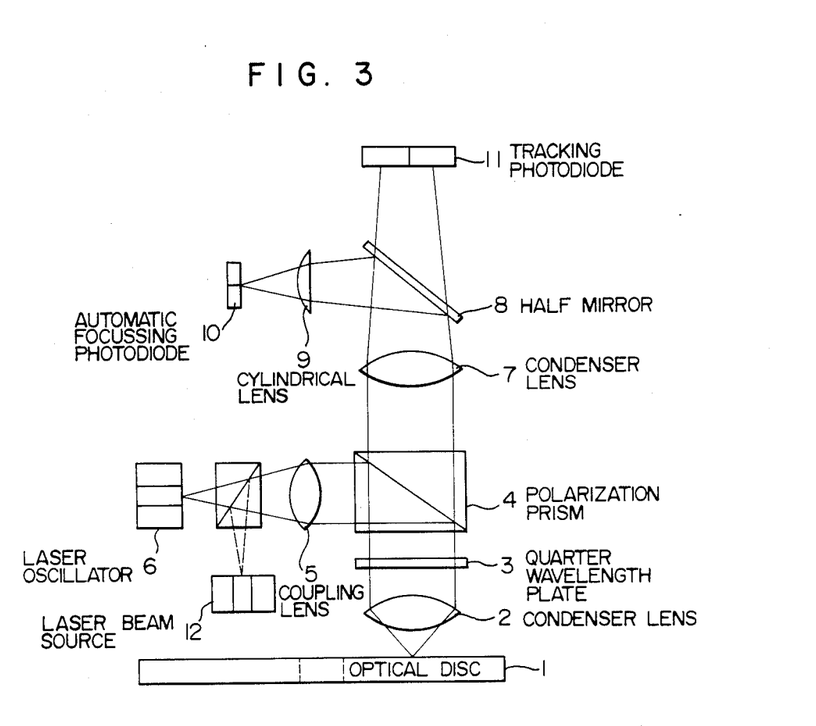
FIG. 3 is an illustration of an optical system incorporated in an information recording and reproducing apparatus of the invention.

FIGS. 2 and 3 show an embodiment of information recording and reproducing apparatus in accordance with the invention, as well as an example of the arrangement of optical system for recording, reproduction and erasure of an optical disc.

This embodiment employs an optical disc 1 having an optically polished glass substrate on which is formed a recording medium in accordance with the invention. In operation, argon-ion laser beam, modulated into pulses in accordance with the signals to be recorded, is applied to the optical disc 1 while the latter is being rotated thereby causing a change in color (i.e., change in hue and variable-density in color), which is different from the substrate, in the minute local portions of the disc 1. When the recording medium is a DAD, PCM (Pulse Code Modulation) audio signals are used as the signals to be recorded, whereas when it is a video disc, FM (Frequency Modulation) video signals, the wave-form of which has been sliced at its upper and lower portions into the form of pulses, are used as the signals to be recorded.

In FIG. 2, the optical disc 1 is rotated by a motor 15 at a constant speed regulated by a speed control means 18 in cooperation with a tachometer 16. For the purpose of recording and reproduction, a laser beam (shown by broken line) from a laser beam source 6 is applied to the optical disc 1 through a focussing lens 5, beam splitter 26, quarter wavelength plate 3, focussing lens 2 and a focussing sensor 13. Focussing controller 14 controls focussing lens 2. The reproduction can be carried out through detection of the state of reflection of the laser beam from the optical disc 1 or polarization or transmission of the laser beam by the optical disc 1. More specifically, the amount of any change in the reflection, polarization or the transmissoon is detected by the light-receiving element 22. The signal thus detected is processed by a reproduction signal processing means 24 and becomes an output signal. On the other hand, the recording is effected by means of applying a laser pulse modulated by a recording signal processing means 23 onto the optical disc 1. On carrying out the recording, reproduction and erasure, the tracking is effected by a movable mirror 17 which is moved by a tracking qontrol means 20. The control of the operation modes and other factors such as speed is effected by a controller 25. A reference numeral 19 designates a movable stage. Cn carrying out the erasure the beam from the laser beam source 12 is applied to the optical disc 1 through a splitter 21 and a beam splitter 26.

In FIG. 3, the laser beam oscillated by the laser oscillator 6 is magnified by a coupling lens 5 and is applied to the disc 1 by a polarization prism 4 through the quarter wavelength plate 3 and the condenser lens 2. The beam reflected by the optical disc 1 is used, after having passed through a condenser lens 7, in the tracking. The tracking is detected and controlled by a tracking photodiode 11.

A part of the reflected beam is reflected by a half mirror 8 and is directed through a cylindrical lens 9 to an automatic focussing photodiode 10 which conducts an automatic focussing and detection of the reproduced signal.

It is thus possible to record and reproduce information by application and reflection of the laser beam to and from the optical disc. The erasure is conducted in the same way as the recording by making use of another laser beam source 12.

More specifically, the reproduction is conducted through detection of any change in the spectral reflectance, transmissivity, polarization or refractive index for the laser beam applied to the optical disc. The change in the reflectance and polarization, as well as the refractive index, is measured by detecting the level of the intensity of reflected beam with respect to the intensity of the applied beam or detecting any change in the angle of the beam. On the other hand, the transmissivity is measured by detecting the intensity of the applied beam after having passed through the disc. Semiconductor light-receiving element (photodiode) is used for these detections.

From the foregoing description, it will be understood that, according to the invention, any information can be recorded, reproduced and erased by making use of the fact that optical characteristics such as spectral reflectance, laser transmissivity and so forth of the recording medium material are changed by a change in the crystalline structure owing to a phase transformation in the recording medium material. This, however, is not exclusive and the recording may be made by making use of formation of minute convexities and concavities on the recording medium surface caused by a volumetric change attributable to a change in the crystalline structure, even though the spectral reflectance of the medium material itself is not changed. For instance, the recording is made by making use of variation in the reflectance which is caused by mutual interference of the light beams from the convexities and concavities.

The invention provides also an optical disc composed of a substrate having a tracking groove and a thin film of recording medium formed on the substrate, wherein the thin film is made of a metal or alloy which has at least two kinds of crystalline structures in the solid state and which can maintain the crystalline structure obtained in one temperature region even in the other temperature region. The track width is preferably smaller than several micron meters ($\mu$m). When a semiconductor laser is used as the laser source, the track width is preferably 1.6 $\mu$m at the smallest. In the thin film of the optical disc of the invention, the crystalline structure (phase) obtained at the equilibrium state in the lower temperature side is preferably used as the base or background. Thus, the writing of information is made first by forming the crystalline structure (phase) peculiar to the high temperature side and then super-cooling the thin film such that the thus formed crystalline structure (phase) is maintained also in the lower temperature side. By this method, it is possible to record the information at a higher density. In this state, the writing is conducted in a spot-like manner, such as to fully or partially penetrate the thickness of the recording medium.

When the writing has been conducted by heating at high temperature region followed by super-cooling, the erasion is made by a heating which is conducted in such a manner as to change the phase maintained as a result of the super-cooling into the phase which is obtained at the equilibrium state in the lower temperature region. Conversely, when the writing has been conducted by changing the phase into the phase in the low temperature region, the erasure is effected by a heating to the high temperature region followed by super-cooling.

Preferably, the tracking groove is formed on the side of the optical disc opposite to the side which receives the beam, and the recording medium is formed on the groove. In such a case, it is necessary that the substrate be transparent to the applied beam. Since the recording medium is made of a metal or alloy and is heated during the writing or erasion, the recording medium is coated on its surface by a protective film which is preferably transparent to the applied beam. An example of the material suitably used as the protective film is $SiO_2$. It is also preferred that the depth of the tracking groove is about a quarter of the wavelength of the beam to be used.

The recording and erasion may be conducted simultaneously by making use of two different beams. Namely, the information already written may be erased by one beam and the writing is made by another mean immediately after the erasion.

The invention proposes also a method of recording, reproducing and erasing information having the steps of: preparing a recording medium made of a material which has at least two kinds of crystalline structures in the solid state and which is capable of maintaining the crystalline structure obtained in one temperature region even in the other temperature region; locally heating the recording medium to form the high-temperature crystalline structure followed by a super-cooling so as to maintain the thus formed crystalline structure even after being cooled to the lower-temperature region thus recording the desired information; applying a light beam to the recorded portion of the recording medium so as to detect any difference in the optical characteristics between the locally heated portion and a portion which was not heated, thus reproducing the recorded information; and heating the recorded portion of the recording medium to a temperature which is lower than the temperature of the local heating for recording, thus erasing the recorded information.

Preferably, a laser beam is used as the light beam. In such a case, the laser beam preferably has a short wavelength. Since the difference in the reflectance between the portion which was heated and the portion which was not heated is maximum at the wavelength of around 500 nm, it is preferable that the laser beam used in the recording and reproduction has such a wavelength. Usually, the same laser beam source is used both for recording and reproduction, while the erasure is made by another laser beam source which irradiates a laser beam having a smaller energy density than the laser beam used for the recording and reproduction.

The invention proposes also a photo-memory material which has at least two kinds of crystalline structures in the solid state and which can maintain a crystalline structure obtained in one temperature region even in the other temperature region. With this memory material, an optical recording of information is made by making use of a change in one of the optical characteristics such as spectral reflectance, polarization, transmissivity and refractive index, which change being caused by a change in the crystalline structure (phase) of the material.

EXAMPLES

(Example 1)

Reversibilities of change in color and spectral reflectance were confirmed with a foil made by the melt quenching method. The specimen was prepared from a ternary Cu-Al-Ni alloy. The material was first molten in a vacuum high-frequency induction furnace and was formed into an ingot. The ingot exhibited a gold color. The ingot was then molten and the melt was poured onto the surface of a single roll or into the space between two rolls of a twin roll rotating at a high speed so as to quench the melt, thus forming a foil in the form of a ribbon. The single roll used was a Cu roll of 300 mm dia. plated with Cr on its surface, while the twin roll was a Cu-Be roll of 120 mm dia. In both cases, the peripheral speed of roll was set to 10 to 20 m/s. Using a quartz nozzle, the melting of mother alloy was conducted at a rate of about 10 g per one charge, thus forming ribbon-shaped foils of 5 mm wide, 0.03 to 0.1 mm thick and several meters in length. Some of the foils showed gold color, while others showed brown color depending on the alloy composition. These foils were heated to various temperatures and then quenched and changes in the color and spectral reflectance were examined.

Figure 4:
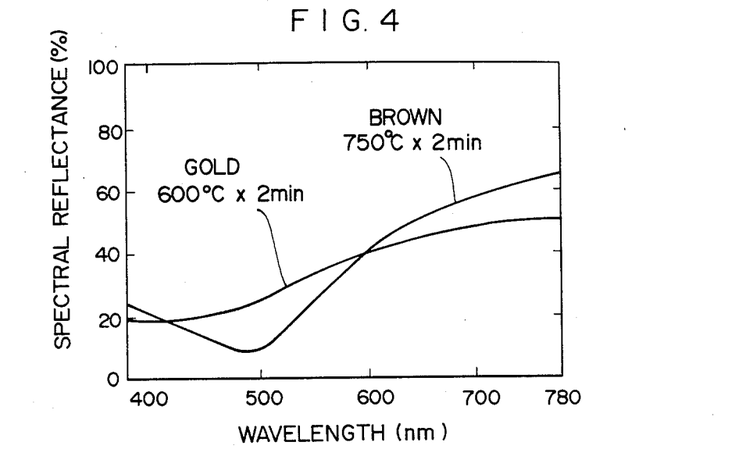
FIG. 4 is a diagram showing spectral reflectance of a Cu-Al-Ni alloy foil according to the invention.

FIG. 4 is a diagram showing the spectral reflectances of ribbons, which were formed from a Cu-14.2 wt % Al—4.01 wt % Ni alloy by the above-explained process using the single roll, after having been heated for 2 minutes at 750° C. and 600° C., respectively, and then water-cooled. Before the heat treatment, the surfaces of the ribbons were polished by #800 emery paper. The ribbons exhibited brown color at the quench-solidification state, gold color after the heat treatment at 600° C. and brown color after the heat treatment at 750° C. As will be understood from this Figure, a large difference in spectral reflectance is observed in the wavelength around 500 nm. Namely, in this wavelength, the foil of brown color showed a spectral reflectance of 8.5%, while the foil of gold color showed a spectral reflectance of 23.9% which is about three times as large as that of the former. Accordingly, it is confirmed that the recording and reproduction of information can be made efficiently in this wavelength. region.

Figure 5:
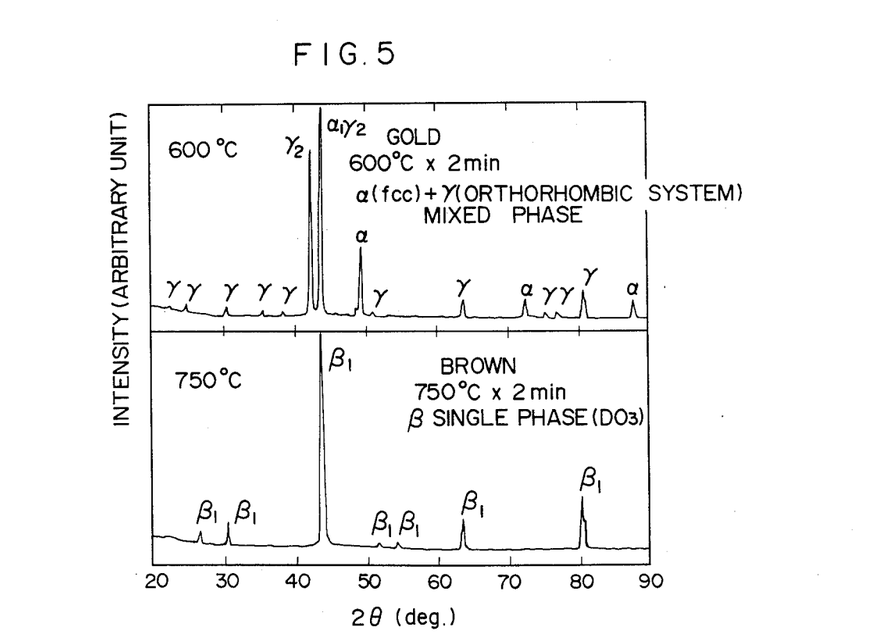
FIG. 5 is an X-ray diffraction pattern diagram of the alloy foil shown in FIG. 4.

FIG. 5 is a diagram showing X-ray diffraction patern exhibited by the ribbon after the heat treatment. A Cu-$K_{60}$ beam source of 40 kV and 100 mA was used in the X-ray diffraction. From this Figure, it is understood that, at 750° C., a $DO_3$-type regular structure is formed and, hence, that the single $\beta$-phase has been formed. On the other hand, at 600° C., the structure includes $\alpha$-phase (fcc) and $\gamma$-phase (orthorhombic). It is thus clear that the color and the spectral reflectance are largely changed as a result of change in phase from single $\beta$-phase to $(\alpha+\gamma)$-phase. When the specimen heat-treated at 600° C. was heat-treated again at 750° C., the color, spectral reflectance and X-ray diffraction pattern were reversibly changed into the original brown color and single $\beta$-phase pattern, respectively.

Figure 6:
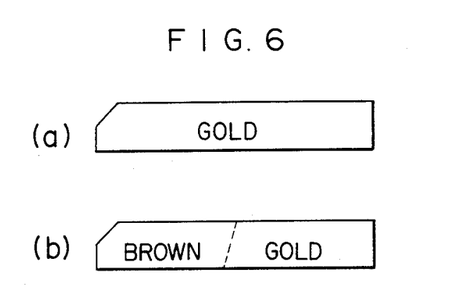
FIGS. 6 and 7 are plan views of the alloy foil shown in FIG. 4 in the state in which the crystalline structure has been changed or the letters have been recorded by heating.

In FIG. 6, (a) shows a ribbon heat-treated at 600° C. and, hence, exhibiting gold color, while (b) shows the appearance of the same ribbon, the half of which has been heated by means of a lighter followed by a cooling so as to change its color into brown. More specifically, as shown in (b) the portion which is at the left side of the broken line exhibits a brown color, while the portion at the right side of the broken line exhibits gold color. In this way, it is possible to change the color easily by local heating. It was also confirmed that the boundary between the region of brown color and the region of gold color was very clear and distinctive. Further, when the portion the color of which has been changed into the brown color was heated similarly by the lighter to a temperature which was slightly lower than the first heating temperature, the color could be changed again into gold.

Figure 7:
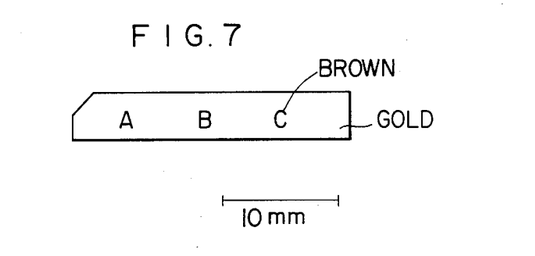

FIG. 7 shows ribbon foil on which the letters were written by application of a YAG (Yttria Aluminum Garnet Neodymium) laser beam having a beam diameter of about 0.5 mm as the heating means. The matrix of the ribbon foil has been heat-treated so as to exhibit gold color. The laser beam was oscillated in the form of pulses with a pulse width of 1 $\mu$s, so that the letters were formed by a plurality of dots heated by the pulses of laser beam. The portions heated as the letters A, B and C changed the color into brown and thus could be clearly distinguished from the gold background exhibited by the matrix. These letters can be erased by heating the ribbon foil under such a condition that the ribbon foil becomes gold color. It is thus possible to repetitionally record and erase the information such as letters and patterns by locally heating the ribbon foil to the predetermined temperatures by a laser beam. Further, the written information cannot be erased unless the material is heated to the erasing temperature, so that it can be stored almost permanently.

(Example 2)

Figure 8:
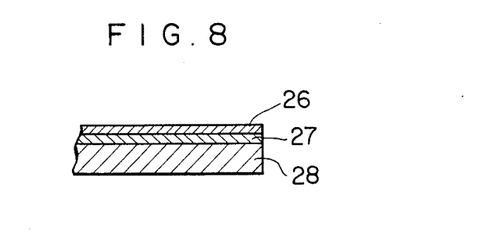
FIG. 8 is a sectional view showing an example of the construction of the optical disc according to the invention.
Figure 9A:
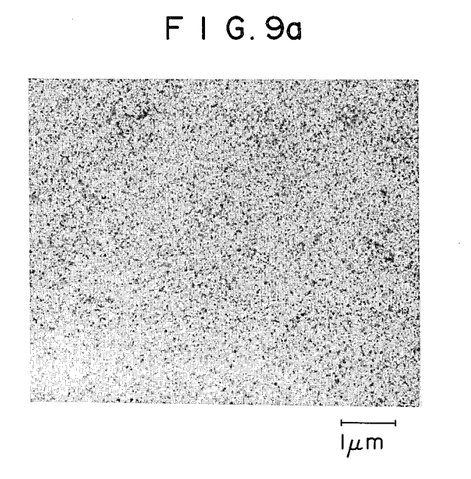
FIGS. 9a and 9b are photomicrographs by transmission electron microscope of the metallic structure of an alloy film according to the invention formed by sputtering.
Figure 9B:
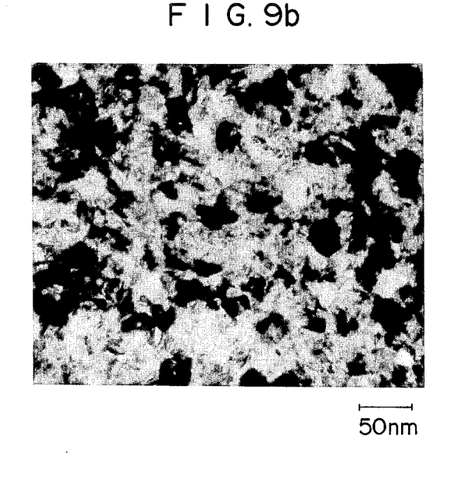

Reversible change in color was confirmed with a thin film which was formed by sputtering vacuum evaporation. A disc of 100 mm dia. and 5 mm thick was cut out from the ingot produced in Example 1 and used as the target for the sputtering apparatus. A glass plate of 0.8 mm thick was used as the substrate for the sputtering vacuum evaporation. In order to prevent the sputtered film from being oxidized by heating and exfoliated from the substrate during writing and erasure, the surface of the film was coated with an $SiO_2$ protective film of 30 nm thick formed by vacuum evaporation. FIG. 8 shows this film in section. A D.C. magnetron-type sputtering system was used in the formation of the alloy film 27 on the glass substrate 28, while an RF-type sputtering system was used in the formation of the $SiO_2$ film 26. The sputtering power was selected to range between 140 and 200 W, while the substrate temperature was maintained at 200° C. The vesel used for the sputtering was evacuated to a level of about $10^{-5}$. Torr and was charged with Ar gas to a level of 5 to 30 mTorr. The thickness of the alloy film was varied within the range between 0.05 and 10 μm, while the thickness of $SiO_2$ film was selected to about 30 nm. FIG. 9a is a photomicrograph by transmission electron microscope of the alloy film of 300 nm thick prepared under the above-explained sputtering condition, while FIG. 9b shows a photomicrograph of the same at a greater magnification. It will be seen that the structure of the alloy film has ultra-fine crystal grains which can not be clearly recognized at a magnification in FIG. 9a. From FIG. 9b showing the same at a greater magnification, it will be seen that the grain size is around 30 nm. It is, therefore, considered that the recording, reproduction and erasure can be conducted without being substantially affected by the crystal grains.

Figure 10:
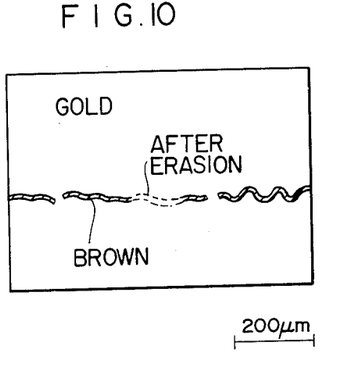
FIG. 10 is a plan view of a film surface of an alloy film according to the invention formed by sputtering, in which information has been recorded by an Ar laser beam.

FIG. 10 shows how the color of an alloy film is changed as a result of writing and erasure of information to and from the film by heating with an Ar gas laser beam and cooling. In this case the Ar gas laser beam was oscillated continuously. The specimen was placed on a manually movable stage and was moved while the laser beam was focussed on the specimen surface, such that the surface of the specimen was scanned by the laser beam. As a result, the portion irradiated by the laser beam, shown by hatched lines in FIG. 10 including the section shown by broken lines, changed its color into brown thus accomplishing the writing. Thus, the hatched portion is the area which has been scanned with the Ar gas laser beam of 200 mW power. The alloy film was heat-treated beforehand together with the substrate so as to exhibit gold color. Then, the alloy was scanned at the portion shown by broken lines in the up and down direction as viewed in FIG. 10 by the laser beam which, in this case, was used in a slightly out-of-focus state so as to reduce the power density. In consequence, the portion shown by the broken line of the brown color, scanned with the laser beam of the reduced power density, changed its color into gold again. From this fact, it was confirmed that the recording and erasure by making use of a change in color is possible also with the alloy in the form of a thin film. It was confirmed also that writing and erasure can be repeated for many times almost unlimitedly. (Example 3)

The manner of change in the color of powders obtained from the ingot produced in Example 1 was examined. The powders were obtained as the chips which were produced when the ingot was cut by a cutting machine. Since the ingot is rather brittle, the chips as the powders are considerably small in size. The chips were then pulverized into the size of under 100 mesh (about 140 μm). The powders immediately after the pulverization showed gold color but changed their color into brown when they were heated at 800° C. for 1 minute and then water-cooled.

The powders thus formed were further refined into particles of sizes of several micron meters (μm) by means of a ball mill and was mixed with a polyimide system organic matter. The mixture was then applied to a glass substrate and was fired in a non-oxidizing atmosphere so as to form an alloy film of about 100 μm thick. An $SiO_2$ film of about 30 μm thick was formed on the surface of this alloy film by vacuum evaporation. The glass substrate was mirror-polished and also the alloy film was mirror-polished. The alloy film thus formed exhibited gold color but changed its color into brown when irradiated with a laser beam as in the case of preceding Examples, thus proving the possibility of information recording.

(Example 4)

Figure 11A:
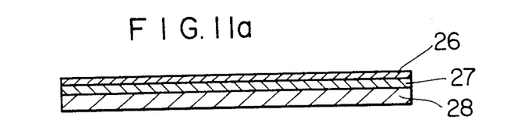
FIGS. 11a and 11b are sectional views showing the construction of the optical disc according to an embodiment of the invention.
Figure 11B:
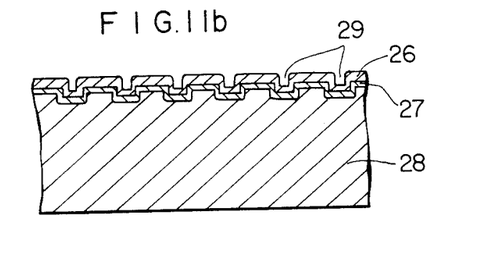

FIGS. 11a and 11b are sectional views of an optical disc which has a recording medium 27 of a Cu-Al-Ni alloy film formed on a glass substrate 28 of 120 mm dia. and 0.8 mm thick by the same sputtering techniques as that used in Example 2, and an $SiO_2$ film 26 formed on the recording medium 27. In the formation of the thin film of Cu-Al-Ni alloy, the ingot obtained in Example 1 was used as the sputtering target. The glass substrate was provided beforehand with a tracking groove 29 of a track width of 0.8 μm and a pitch of 1.6 μm. The groove 29 had a depth corresponding to one quarter of the wavelength of the laser beam. Since in the alloy according to the invention the maximum difference in spectral reflectance is obtained in the wavelength of around 500 nm as mentioned before, an Ar laser beam which has a wavelength closest to that wavelength was used. Thus, the depth of the tracking groove was selected to about 120 μm. The thicknesses of the alloy film and the $SiO_2$ film were the same as those in Example 2. The alloy film after being formed by sputtering showed gold color. Using the apparatus shown in FIG. 2, this optical disc was locally heated to 750° C. so as to record an information in the form of brown pits. The erasure was conducted by heating at 500° C. by means of a laser beam which was oscillated continuously, thereby recovering the gold color. The writing laser beam was applied following up the erasing laser beam such that the portion irradiated with the erasing laser beam is heated again to 750° C. by the writing laser beam thereby changing the color into brown again, thus accomplishing the erasure and rewriting materially simultaneously.

The rewriting and erasure were conducted cyclically and repetitionally and it was confirmed that the initial writing and erasing characteristics of the recording medium can be maintained despite the repetition of many rewriting and erasure cycles.

It will be understood that the information recording and reproducing apparatus of the invention permits an easy rewriting of the information, as well as recording and reproduction.

What is claimed is

1. An information recording and reproducing apparatus comprising:
    a substrate;
    a recording medium provided on said substrate;
    a beam controlling means for focussing an energy beam onto said recording medium, wherein said energy beam is a laser beam or electron beam;
    means for receiving a beam transmitted through or reflected from said recording medium; and
    means for outputting said beam transmitted through or reflected from said recording medium as a signal;
    characterized in that said recording medium is made of an alloy which has in its solid state at least two different crystalline structures, one of said at least two crystalline structures existing at a first temperature higher than room temperature and another of said at least two crystalline structures existing at a second temperature lower than said first temperature but higher than room temperature; wherein said alloy, after being quenched from said first temperature to room temperature, exhibits a crystalline structure different from said another of said at least two crystalline structures and, after being heated to said second temperature and cooled to room temperature, exhibits said another of said at least two crystalline structures; wherein said alloy does not undergo a martensitic transformation; wherein recording or erasing is carried out by utilizing a change in any of color, spectral reflectance and X-ray diffraction pattern due to change in crystalline structure of a portion of said recording medium; and wherein said alloy is selected from the group consisting of an alloy consisting essentially of 44–49 at. % Cd and balance Ag; an alloy consisting essentially of 2–7 wt. % Mo and balance U; an alloy consisting essentially of 3–11 wt. % Nb and balance U; an alloy consisting essentially of 2–7 wt. % Re and balance U; an alloy consisting essentially of 5–50 wt. % Cu and balance Mn; an alloy consisitng essentially of 2.5–4.0 wt. % Al and balance Au; an alloy consisting essentially of 6–10 wt. % Al and balance Ag; an alloy consisting essentially of 0.1–10.0 wt. % Au and/or 0.1–15.0 wt. % Cu, 6–10 wt. % Al and balance Ag; an alloy consisting essentially of 0.01–2.0 wt. % Al, 43–59 wt. % Cd and balance Ag; and an alloy consisting essentially of 30–46 wt. % Zn and balance Ag.

2. An information recording and reproducing apparatus as claimed in claim 1, wherein asid recording medium is a foil or film formed by quench-solidification directly from gaseous or liquid phase.

3. An information recording and reproducing apparatus as calimed in claim 1, wherein said recording medium is a powder which is applied to the surface of said substrate so as to form a thin film on said substrate.

4. An information recording and reproducing apparatus as claimed in claim 1, wherein said recording medium is divided into fine segments of a size corresponding to the unit of recording.

5. An information recording and reproducing apparatus as claimed in claim 1, wherein said energy beam is a laser beam.

6. An information recording and reproducing apparatus according to claim 1, wherein said recording medium is protected by a coating film of material which causes no chemical change by heating.

7. An information recording and reproducing apparatus according to claim 1, wherein said alloy is reversibly changeable between said at least two different crystalline structures.

8. An information recording and reproducing apparatus according to claim 1, wherein said substrate has a tracking groove on its surface and said recording medium is provided on said tracking groove.

9. An information recording and reproducing apparatus according to claim 1, wherein said alloy, after being quenched from said first temperature to room temperature, maintains said one of said at least two crystalline structures.

10. An information recording and reproducing apparatus comprising:
a substrate;
a recording medium provided on said substrate;
a beam controlling means for focussing an energy beam onto said reocrding medium, wherein said energy beam is a laser beam or electron beam;
means for receiving a beam transmitted through or reflected from said recording medium; and
means for outputting said beam transmitted through or reflected from said recording medium as a signal;
characterized in that said recording medium is made of an alloy which has in its solid state at least two different crystalline structures, one of said at least two crystalline structures existing at a first temperature higher than room temperature and another of said at least two crystalline structure existing at a second temperature lower than said first temperature but higher than room temperature; wherein said alloy, after being quenched from said first temperature to room temperature, exhibits a crystalline structure different from said another of said at least two crystalline structures and, after being heated to said second temperature and cooled to room temperature, exhibits said another of said at least two crystalline structures; wherein said alloy has a martensitic transformation temperature wherein said alloy has a martenisitic transformation temperature lower than room temperasture; wherein recording or erasing is carried out by utilizing a change in any of color, spectral reflectance and X-ray diffraction pattern due to change in crystalline structure of a portion of said recording medium; and wherein said alloy is selected from the group consisting of an alloy consisting essentially of 23–28 at. % Au, 45–47 at. % Zn and balance Cu; an alloy consisting essentially of 18–23 at. % T1 and balance In; alloy consisting essentially of 6–12 wt. % Al, 0.1–12.0 wt. % M, 0.1–24.0 wt. % Zn and balance Cu; an alloy consisting essentially of about 30 wt. % Cu, 40–50 wt. % Ti 0.01–5.0 wt. % of an at least one element selected from the group consisting of Al, Zr, Co, Cr and Fe and balance Ni; an alloy consisting essentially of 14.0–16.5 wt. % Al and balance Cu; an alloy consisting essentially of 14.0–16.5 wt. % Al, 0.01–20.0 wt. % Ni and balance Cu; an alloy consisting essentially of 14.0–16.5 wt. % Al, 0.01–15.0 wt. % Mn and balance Cu; an alloy consisting essentially of 14.0–16.5 wt. % Al, 0.01–10.0 wt. % Fe and/or 0.01–10.0 wt. % Cr and balance Cu; an alloy consisting essentially of 21–30 wt. % Ga and balance Cu; an alloy consisting essentially of 0.01–3.0 wt. % Al, 21–30 wt. % Ga and balance Cu; an alloy consisting essentially of 20–40 wt. % In and balance Cu; an alloy consisting essentially of 0.01–3.0 wt. % Al, 20–40 wt. % In and balance Cu; an alloy consisting essentially of 20–38 wt. % Ge and balance Cu; an alloy consisting essentially of 0.01–3.0 wt. % Al, 20–28 wt. % Ge and balance Cu; an alloy consisting essentially of 16–35 wt. % Sn and balnce Cu; and an alloy consisting essentially of 0.01–3.0 wt. % Al, 16–35 wt. % Sn and balance Cu.

11. An information recording and reproducing apparatus according to claim 10, wherein said recording medium is made of a Cu-base alloy containing at least one of Al, Ga, In, Sb, Si, Sn and Zn, said Cu-base alloy having a crystalline structure at said first temperature including $\beta$-phase, said $\beta$-phase being formed and maintained at room temperature as a result of heating to said first temperature followed by a quenching to room temperature, and a crystalline structure at said second temperature including β-phase, said crystalline structure at said first temperasture and said crystalline structure at said second temperature exhibiting different spectral reflectances.

12. An information recording and reproducing apparatus as claimed in claim 10, wherein said energy beam is a laser beam.

13. An information recording and reproducing apparatus according to claim 12, wherein said substrate has a tracking groove on its surface and said recording medium is provided on said tracking groove.

14. An information recording and reproducing apparatus according to claim 10, wherein said alloy is reversibly chanageable between said at least two different crystalline structures.

15. An information recording and reproducing apparatus according to claim 10, wherein said alloy, after being quenched from said first temperature to room temperature, maintains said one of said at least two crystalline structures.

* * * * *